United States Patent
Zhang et al.

(10) Patent No.: US 9,049,498 B2
(45) Date of Patent: Jun. 2, 2015

(54) METHOD AND SYSTEM FOR REALIZING INTERACTION OF EMBEDDED DATA IN MULTIMEDIA

(75) Inventors: Wenping Zhang, Beijing (CN); Xiang Gao, Beijing (CN); Dezhi Zhang, Beijing (CN)

(73) Assignee: Xiaodong Yang

( * ) Notice: Subject to any disclaimer, the term of this patent is extended or adjusted under 35 U.S.C. 154(b) by 294 days.

(21) Appl. No.: 12/521,333

(22) PCT Filed: Dec. 5, 2007

(86) PCT No.: PCT/CN2007/003446
§ 371 (c)(1),
(2), (4) Date: Jun. 26, 2009

(87) PCT Pub. No.: WO2008/080293
PCT Pub. Date: Jul. 10, 2008

(65) Prior Publication Data
US 2010/0325243 A1    Dec. 23, 2010

(30) Foreign Application Priority Data
Dec. 31, 2006    (CN) .......................... 2006 1 0171636

(51) Int. Cl.
*G06F 15/16*    (2006.01)
*H04N 21/858*    (2011.01)
(Continued)

(52) U.S. Cl.
CPC ............. *H04N 21/858* (2013.01); *G06Q 30/02* (2013.01); *H04N 21/47815* (2013.01); *H04N 21/2542* (2013.01); *H04N 21/812* (2013.01)

(58) Field of Classification Search
CPC ............ H04N 21/4532; H04N 21/482; H04N 21/44222; H04L 29/08936; H04L 29/08927; H04L 29/08072; H04L 29/06; H04L 29/0809; H04W 8/18
USPC .......... 709/206, 219, 223; 715/234, 716, 738; 725/105
See application file for complete search history.

(56) References Cited

U.S. PATENT DOCUMENTS 6,169,846 B1 *    1/2001    Ohishi .......................... 386/241
2001/0037488 A1    11/2001    Lee
(Continued)

FOREIGN PATENT DOCUMENTS

CN    1317752 A    10/2001
CN    1761316 A    4/2006
(Continued)

OTHER PUBLICATIONS
International Search Report dated Jan. 31, 2008, issued in corresponding international application No. PCT/CN2007/003446.
(Continued)

*Primary Examiner* — Thuong Nguyen
(74) *Attorney, Agent, or Firm* — Joe Zheng

(57) ABSTRACT

Techniques for realizing interactive information through multimedia are described to solve the problem in the prior art that a server can-not be accessed directly through a multimedia advertisement in multimedia. One embodiment of the techniques includes: a user terminal configured to parse and play the multimedia file to obtain the interactive information in the multimedia file. The user terminal accesses the server upon the trigger of the interactive information by the user. The techniques can be used to access the server through the interactive information in multimedia, and enables the transaction with the server more convenient and quickly.

19 Claims, 5 Drawing Sheets

(51) Int. Cl.
*G06Q 30/02* (2012.01)
*H04N 21/478* (2011.01)
*H04N 21/254* (2011.01)
*H04N 21/81* (2011.01)

(56) References Cited

U.S. PATENT DOCUMENTS

| | | | |
|---|---|---|---|
| 2002/0010769 A1* | 1/2002 | Kippenhan et al. | 709/223 |
| 2002/0033844 A1* | 3/2002 | Levy et al. | 345/744 |
| 2002/0154163 A1 | 10/2002 | Melchner | |
| 2003/0006911 A1 | 1/2003 | Smith et al. | |
| 2003/0101185 A1* | 5/2003 | Hsieh | 707/10 |
| 2003/0142653 A1* | 7/2003 | Jiang et al. | 370/338 |
| 2005/0256596 A1* | 11/2005 | Kataoka | 700/94 |
| 2006/0140134 A1* | 6/2006 | O'Brien et al. | 370/252 |
| 2006/0230135 A1* | 10/2006 | Wolfston et al. | 709/224 |
| 2007/0250863 A1* | 10/2007 | Ferguson | 725/46 |
| 2007/0286032 A1* | 12/2007 | Townsend et al. | 369/27.01 |
| 2008/0126943 A1* | 5/2008 | Parasnis et al. | 715/730 |
| 2008/0250030 A1* | 10/2008 | Itoh | 707/100 |

FOREIGN PATENT DOCUMENTS

| | | |
|---|---|---|
| JP | 9162818 | 6/1997 |
| JP | 2001297233 | 10/2001 |
| JP | 2002063103 | 2/2002 |
| KR | 20060006319 A | 1/2006 |

OTHER PUBLICATIONS

Supplementary European Search Report, Jul. 12, 2010.

* cited by examiner

| TLV type |
|---|
| TLV length |
| sub-TLV 1 type |
| sub-TLV 1 length |
| sub-TLV 1 data |
| sub-TLV 2 type |
| sub-TLV 2 length |
| sub-TLV 2 data |
|  |
| ... |
| ... |
| ... |
| sub-TLV n type |
| sub-TLV n length |
| sub-TLV n data |

METHOD AND SYSTEM FOR REALIZING INTERACTION OF EMBEDDED DATA IN MULTIMEDIA

CROSS REFERENCE TO RELATED APPLICATIONS

The present application is a 35 U.S.C. §371 National Phase conversion of PCT/CN2007/003446, filed Dec. 5, 2007, which claims benefit of Chinese Application No. 200610171636.8, filed Dec. 31, 2006 the disclosure of which is incorporated herein by reference. The PCT International Application was published in the Chinese language.

BACKGROUND

1. Technical Field

The present invention relates to the area of communication, and more particularly, to a method and a system for realizing interactive information through multimedia.

2. Background Art

With the fast development of mobile communication, the functions of user terminal are becoming more advanced. Many user terminals now support online browsing, digital photography, television, network video and the like. Users can realize various operations like online transaction and online bank transfer through a user terminal.

Currently, a major source of income for many Internet service providers is from online advertisements. Therefore, the multimedia files played on many user terminals are the potentials for showing advertisements. The user terminals include mobile phones, computers and televisions. However, when the user watches a multimedia file through a user terminal, the user terminal only supports playing back a multimedia file but does not support the activation of advertising information in the multimedia file by the user so that the user cannot make a connection through the user terminal to a server that provides products or services related to the advertisement. The user needs to manually input a website address to log on to the website to browse information related to a promotion being advertised, and then logs on to an online bank to make the payment to purchase, and accesses the server; or carries out a telephone purchase if needed.

In summary, the prior art is unable to access a server through the advertisements in a multimedia being shown.

SUMMARY

The present invention provides a method and a system for realizing interactive information through the multimedia, to solve the problem in the prior art that it is unable to access the server through the advertisement in a multimedia being shown.

One embodiment of the present invention includes:
A. a user terminal is configured to parse and play back a multimedia file which contains interactive information carrying a communication sign; B. the user terminal is caused to access a server based on the trigger of the communication sign carried in the interactive information by the user.

The interactive information carrying the communication sign in step A is displayed directly by the played multimedia file.

Step A includes: A1: the user terminal parses and plays back the multimedia file, and is configured to store the interactive information carrying the communication sign, wherein the interactive information is obtained by parsing the data of the multimedia file; A2: during the process of playing back the multimedia files, the user terminal displays the stored interactive information via a first information trigger window on receiving a trigger signal indicating that the user desires to display the interactive information.

The interactive information obtained by the parsing process in step A1 includes: a first type of interactive information and a second type of interactive information.

The steps for displaying the interactive information in the first information trigger window in step A2 include:
the user terminal continuously displays the first type of interactive information in the first information trigger window; or displays the second type of interactive information in the first information trigger window, and during playing the multimedia file, updates the second type of interactive information displayed in the first information trigger window by using the current second type of interactive information.

The format of the interactive information in the multimedia files is TLV format.

The communication sign includes website address information and/or telephone number information.

The interactive information further includes one or more of vendor description information, transaction information, discount information and shopping-ticket returning information.

The transaction information includes one or more of beneficiary bank account information, a vendor name, names of the presented objects and unit price of the presented objects.

The system of the present invention includes: a user terminal and a server.

The user terminal is used for parsing and showing the multimedia file, wherein the multimedia file includes interactive information carrying a communication sign, and accessing the server based on the trigger of the communication sign carried in the interactive information by the user.

The server is used for providing access connection for the user terminal.

The user terminal includes: a multimedia file storage unit, a multimedia player and an interactive information storage unit;

The multimedia file storage unit is used for storing the multimedia file;

The media player is used for parsing and playing the multimedia file, and displaying the interactive information obtained by parsing, and accessing the server based on the trigger of the communication sign carried in the interactive information by the user;

The interactive information storage unit is used for storing the interactive information carrying the communication sign, wherein the interactive information is obtained by parsing the multimedia files.

The media player includes: a parsing unit, an operating unit and an interactive unit.

The parsing unit is used for parsing the multimedia file;

The operating unit is used for playing the multimedia file, and during playing the multimedia file, reading the interactive information that the user desires to display from the interactive information storage unit on receiving the trigger signal indicating that the user desires to display the interactive information, and displaying the interactive information via the first information trigger window;

The interactive unit is used for accessing the server based on the trigger of the communication sign carried in the interactive information by the user.

The interactive information includes a first type of interactive information and a second type of interactive information.

Then, the interactive information storage unit includes:

a first storage unit for storing the first type of interactive information; a second storage unit for storing the second type of interactive information;

The parsing unit is further used for updating the second type of interactive information already stored in the second storage unit by using the current second type of interactive information obtained by parsing during parsing the multimedia files.

The operating unit is used for continuously displaying the first type of interactive information in the first information trigger window; or displaying the second type of interactive information in the first information trigger window, and during playing the multimedia file, updating the second type of interactive information displayed in the first information trigger window by using the current second type of interactive information.

The format of the interactive information in the multimedia file is TLV format.

The communication sign includes website address and/or telephone number information.

The interactive information further includes one or more of vendor description information, transaction information, discount information and shopping-ticket returning information.

The transaction information includes one or more of beneficiary bank account information, a vendor name, names of the presented objects and unit price of the presented objects.

The technical solution of the present invention, in which the user terminal parses and plays the multimedia file, wherein the multimedia file includes interactive information carrying the communication sign, and the user terminal accesses a server based on the trigger of the communication sign carried in the interactive information by the user, enables the user terminal to access the server by the interactive information in the multimedia and makes a transaction with the user more convenient and quick.

BRIEF DESCRIPTION OF THE DRAWINGS

FIG. 4 is a storage structure schematic view of the interactive information in the interactive information storage unit according to the present invention;

DETAILED DESCRIPTION OF THE EMBODIMENTS

The central concept of the present invention is that the user terminal parses and plays one or more multimedia files, wherein the multimedia files include interactive information carrying a communication sign, and the user terminal accesses a server based on the trigger of the communication sign carried in the interactive information by the user.

The format of the interactive information in a multimedia file is in TLV format;

The communication sign includes website address information and/or telephone number information;

The interactive information is contained in the heads of the multimedia files, and/or in the bodies of the multimedia files.

The interactive information further includes one or more of vendor description information, transaction information, discount information and shopping-ticket returning information.

The transaction information includes one or more of beneficiary bank account information, vendor's name, names of the presented objects and the unit price of the presented objects.

Figure 1:
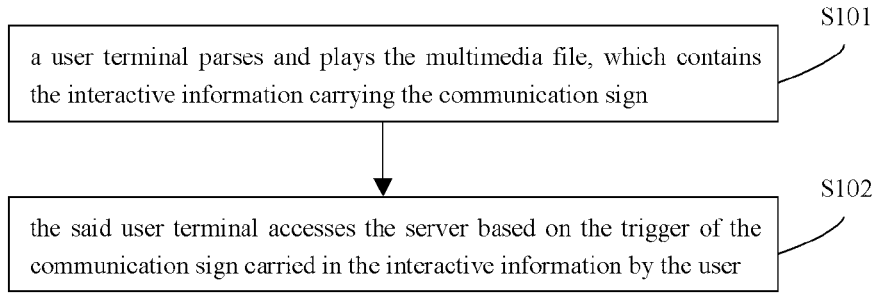
FIG. 1 is a flowchart of the method according to the present invention.

Referring to FIG. 1, the method according to the present invention includes the following steps:

S101: the user terminal is configured to parse and play multimedia files, wherein the multimedia files include interactive information carrying the communication sign;

The user terminal may be a GPRS mobile phone, a 3G mobile phone, a 4G mobile phone, a computer, a PDA or a digital television, and etc.;

The user terminal supports online payment, and Internet-based user identity authentication, user signature and electronic payment;

The user terminal supports popping up advertisement-related interfaces via the trigger of physical buttons or logic buttons, said physical buttons may be different for different user terminals. For example, in mobile phones, they refer to one or more specific buttons in the mobile phone keyboard. In digital televisions, they refer to one or more physical buttons in a remote controller. and In computers, they refer to one functional key or a combination of several keys in the keyboard or a functional key of the mouse. The logic buttons refer to the logical buttons on the media player interface, and the function of the logical buttons is to pop up a payment interface of the objects presented in the advertisement, a selection interface of the advertisement or a menu selection interface during playing the multimedia files.

The format of the multimedia files may be JPEG, MPEG-1, MPEG-2, MPEG-4, MPEG-7, MPEG-21, H.263, H.264 or AVI, and the like.

The interactive information included in the multimedia files played by the user terminal is encoded-and-written into the multimedia files while making the multimedia files.

Preferably, the interactive information carrying the communication sign is displayed in the first information window directly when playing the multimedia files;

Preferably, the user terminal parses and plays the multimedia files, stores the interactive information carrying the communication sign, wherein the interactive information is obtained by parsing; and during the process of playing the multimedia files, the user terminal displays the stored interactive information via the first information window on receiving a trigger signal indicating that the user desires to display the interactive information;

The interactive information obtained by parsing includes: a first type of interactive information and/or a second type of interactive information;

Then, the steps for displaying the interactive information in the first information window include:

The first type of interactive information is displayed continuously in the first information window; and during playing the first type of interactive information, the second type of interactive information is updated and displayed in the first information window by the current second type of interactive information;

The format of the interactive information in the multimedia files is TLV format;

The communication sign includes website address information and/or telephone number information;

S102: the said user terminal accesses the server based on the trigger of the communication sign carried in the interactive information by the user.

The user terminal receives the interactive information triggered by the user from the first information window, and accesses the server by using the received communication sign carried in the interactive information;

The user terminal creates a call connection according to the telephone number information triggered by the user, or logs on to the server according to the website information triggered by the user;

The interactive information further includes one or more of vendor description information, transaction information, discount information and shopping-ticket returning information;

The transaction information includes one or more of beneficiary bank account information, vendor's name, names of the presented objects and the unit price of the presented objects.

Figure 2:
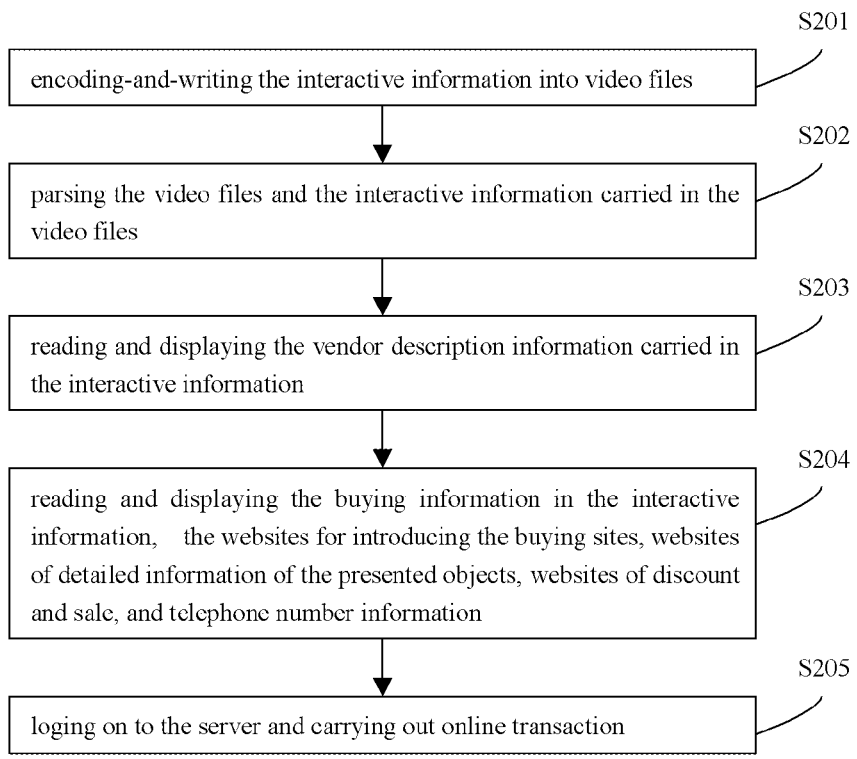
FIG. 2 is a flowchart of the method according to an embodiment of the present invention.

Referring to FIG. 2, the method according to an embodiment of the present invention includes the following steps:

S201: encoding-and-writing the interactive information into video files;

The video files may be multimedia files in any format, and one embodiment of the present invention takes a multimedia file in AVI format as an example to facilitate the explanation of one embodiment of the present invention;

Each item of the interactive information is stored in a multimedia file in TLV format. The format of Type-Length-Value, and all the advertisement information can be assembled in an interactive information TLV;

The interactive information includes: vendor description information, of which the type can be defined as a number of one byte, e.g., with a value of 0, or can be a character string with a fixed length, e.g., for the AVI file structure, the 4 bytes 'DISC' can be used to represent the sub-TLV type. As an example, the English description format of AVI is used, and the 'DISC' is the abbreviation for vendor description or transaction information, of which the type can be defined as a number of one byte, e.g., with a value of 1, or can be a character string with a fixed length, e.g., for the AVI file structure, the 4 bytes 'BUYA' can be used to represent the sub-TLV type, which is the abbreviation for buy address. The TLV further includes some sub-TLVs, e.g., sub-TLV like vendor address, unit price of the presented objects, name of linkman, etc. a website address for introducing buying sites: of which the type can be defined as a number of one byte, e.g., with a value of 2, or can be a character string with a fixed length, e.g., for the AVI file structure. The 4 bytes 'PURC' can be used to represent the sub-TLV type, which is the abbreviation for purchase; a website address of the detailed information of the presented objects: the type of which can be defined as a number of one byte, e.g., with a value of 3, or can be a character string with a fixed length, e.g., for the AVI file structure, the four bytes 'INFO' can be used to represent the sub-TLV type, which is the abbreviation for information; website address of the discount and sale information: the type of which can be defined as a number of one byte, e.g., with a value of 4, or can be a character string with a fixed length, e.g., for the AVI file structure, the four bytes 'DCNT' can be used to represent the sub-TLV type, which is the abbreviation for discount; telephone number information: the type of which can be defined as a number of one byte, e.g., with a value of 5, or can be a character string with a fixed length, e.g., for the AVI file structure, the four bytes of 'TELN' can be used to represent the sub-TLV type, which is the abbreviation for television number; as for the user terminal that does not support telephone dialing function, this item will be hidden automatically and will not be displayed;

All the interactive information is combined into a TLV, the type of which is interactive information TLV, and for the AVI file, a TLV of 'COMC' type, or called list according to the naming of the AVI, can be added to the AVI head via the interactive information. The interactive information TLV may include the respective sub-TLVs, wherein the vendor description information sub-TLV is necessary for each vendor, and in the respective sub-TLVs of the same vendor, it must be placed in the first position, and other sub-TLVs are optional. However, usually for each vendor, at least one of the other types of sub-TLVs is required;

The whole TLV can be written into the head of the video file, or in the video file body; just like the writing manner of captions. The realization manner that the whole TLV may be written in the head of the video files is known to those skilled in the art. However, one video file only supports advertisements of one or several presented objects or service information, which is less flexible. When the whole TLV is written in the video file body, the written interactive information can be updated by the content of the interactive information with the play of the video file, which is more flexible. In addition, for different multimedia files, there may be different ways to embed the interactive information in the multimedia files.

According to one implementation, video files may support both writing manners; the interactive information written in the head of the video files is effective during the whole life cycle of the video file, while the interactive information written in the body of the video files is updated continuously with the playback of the video files.

S202: parsing the video files and the interactive information carried in the video files.

The interactive information encoded-and-written in the video files is parsed by the media player of the user terminal while the video files are being parsed. The parsing result is sent to the interactive information storage unit of the user terminal.

S203: reading and displaying the vendor description information carried in the interactive information.

When the user has an intention for purchasing or for further finding out information related to a presented object or service, the user presses a trigger button. The user terminal is caused to display an interactive interface, and the media playing program of the user terminal reads contents in the interactive information storage unit and displays them via the interactive interface.

The interactive interface may be a menu or a graphic selection interface, the detailed contents of the interface or the menu depend on the interactive information encoded and written into the video files in step S201, and the interactive interface may be a multi-level menu or a multi-level interface. What is displayed on the first level interface of the interactive interface is the vendor description information, namely, the contents of the vendor description information sub-TLV for the respective vendors;

S204: reading and displaying the transaction information, websites for introducing the buying sites, websites for presenting the detailed information of the presented product/service, websites of discount and sale information, and telephone number information in the interactive information.

When the user selects the vendor description information of a vendor, the interactive interface pops up a secondary menu or interface, and the contents of the secondary menu or interface are transaction information, website address for introducing the buying sites, websites for obtaining more goods information, websites of discount and sale information, and telephone number information and etc.

S205: logging on to a server and carrying out an online transaction

After the user selects an operation with respect to a presented object or service from the secondary menu or interface of the interactive interface, the user terminal is caused to be connected to a corresponding bank payment website, goods information website, and etc. The interactive interface pops up a browser interface automatically, wherein the website address of the browser is filled automatically. The browser logs on to the corresponding Internet website through Internet, then the user can perform corresponding operation via the displayed browser interface and carry out the online transaction;

For the user terminal that supports telephone dialing, a call connection can be created directly by the telephone number information triggered by the user.

Figure 3:
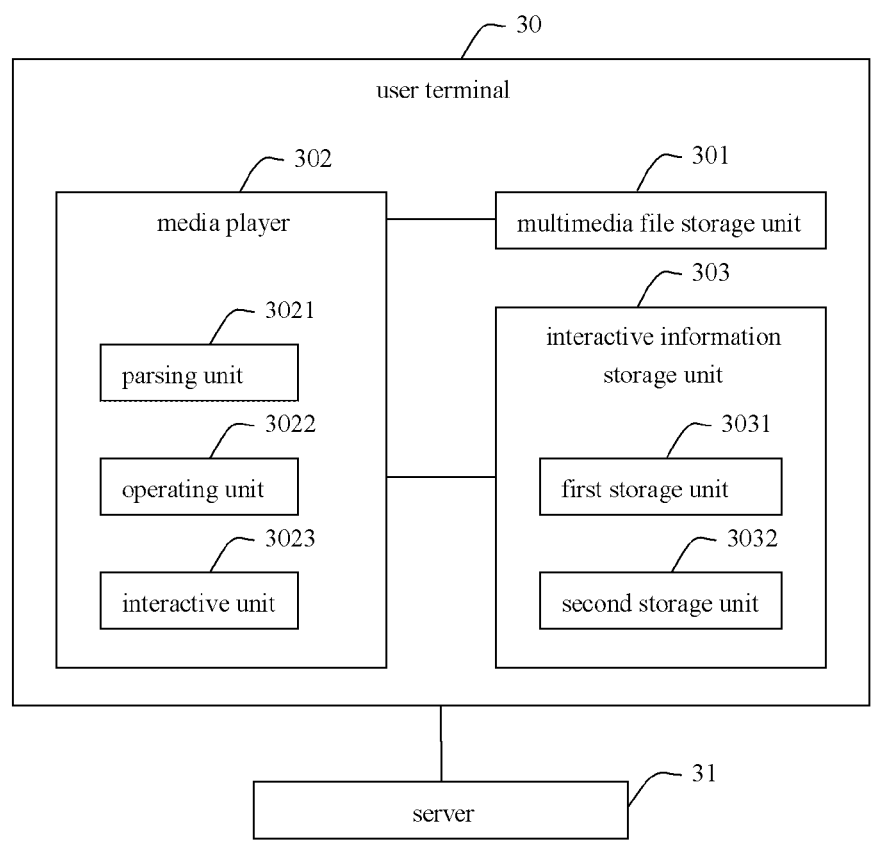
FIG. 3 is a structure schematic view of the system according to an embodiment of the present invention.

Referring to FIG. 3, an exemplary system according to the present invention includes: a user terminal 30 and a server 31.

The user terminal 30 includes: a multimedia file storage unit 301, a media player 302, and an interactive information storage unit 303.

The media player 302 includes: a parsing unit 3021, an operating unit 3022 and an interactive unit 3023.

The interactive information storage unit 303 includes: a first storage unit 3031 and/or a second storage unit 3032.

The user terminal 30 is used for parsing and playing the multimedia files, wherein the multimedia files includes interactive information carrying the communication sign, and accessing the server 31 based on the trigger of the communication sign carried in the interactive information by the user.

The server 31 is used for providing access connection for the user terminal 30.

The multimedia storage unit 301 stores the multimedia files, wherein the multimedia files include interactive information carrying the communication sign.

According to one embodiment of the system, the multimedia files are video files in AVI format;

The current commonly used multimedia files usually use the TLV structure or TLV-like structure, and therefore respective types of multimedia files are suitable for the storage of the interactive information.

The interactive information is included in the video file head and/or the video file body.

For the video files in AVI format, the following two solutions can be used to write the interactive information into the multimedia files.

Solution one: writing the interactive information in the video file head, and the interactive information forms a new list, namely, the TLV is called a 'COMC' list in the AVI file format, and the 'COMC' list is written below the 'avih' chunk in the 'hdrl' list of the AVI. In this way, during playing the whole video file, the interactive information is fixed and will not change with the playing of the video files;

Solution two: writing the interactive information in the video file body, which is similar to a 'txts' stream for displaying captions. an advertising information stream can be added for the interactive information, and the advertising information may change dynamically like the 'txts' stream. The advertising stream is used to load the TLV composed of the interactive information. The interactive information supported by this manner changes dynamically during playing the video files;

The media player 302 parses and plays the multimedia files, and displays the interactive information obtained by parsing, and accesses the server 31 automatically or based on the trigger of the communication sign carried in the interactive information by the user;

The interactive information storage unit 303 is used for storing the interactive information carrying the communication sign, wherein the interactive information is obtained by parsing the multimedia files. FIG. 4 shows a structure schematic view of the interactive information stored in the interactive information storage unit 303.

Figure 5:
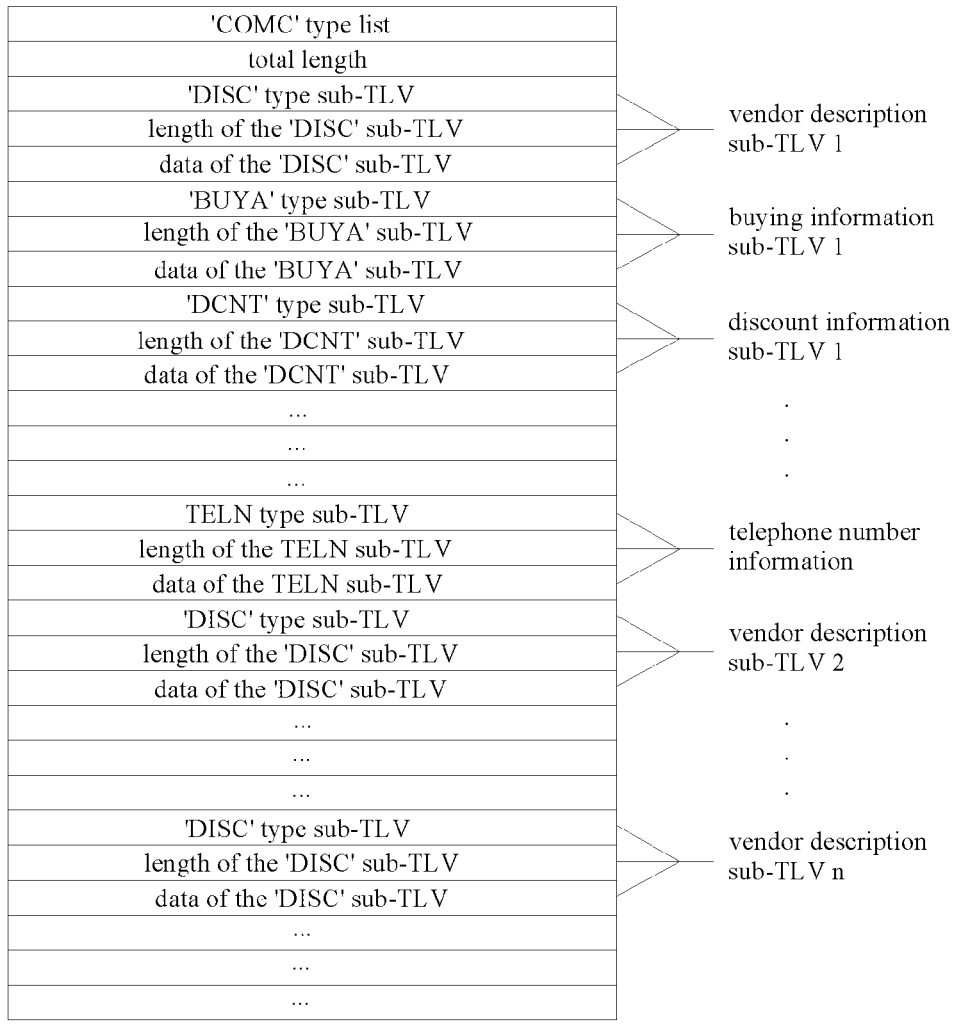
FIG. 5 is storage structure schematic view of the interactive information in AVI format in the interactive information storage unit according to the present invention.

FIG. 5 shows the storage structure schematic view of the interactive information in AVI format. According to one embodiment, the interactive information includes: vendor description information, transaction information, discount information, shopping-ticket returning information and buying address information.

The transaction information includes: bank website address information, beneficiary bank account information, a vendor name, names of the presented object, unit price information of the presented objects and telephone number information.

Figure 6:
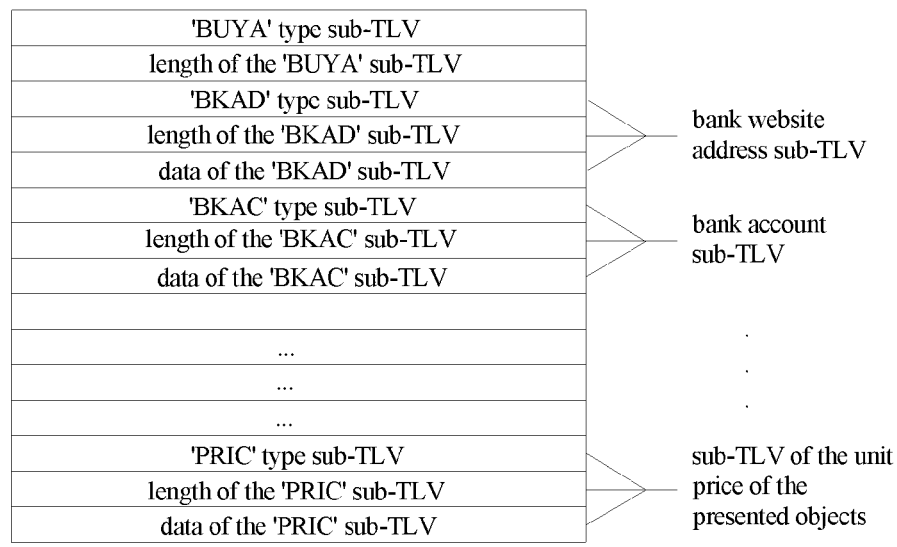
FIG. 6 is a storage structure schematic view of the transaction information sub-TLV carried in the interactive information in the interactive information storage unit according to the present invention.

The structure of the transaction information sub-TLV is shown in FIG. 6. The sub-TLVs included in the transaction information sub-TLV are: sub-TLV of the website address of online bank, the AVI type of which is BKAD (bank address); bank account sub-TLV, the AVI type of which is BKAC (bank account); vendor's name sub-TLV, the AVI type of which is VEND (vendor); sub-TLV of the name of the presented object, of which the AVI type is PROD (product); sub-TLV of the unit price of the presented object, of which the AVI type is PRIC (price).

It is necessary to provide a lock when modifying the contents in the interactive information storage unit 303 At this time, no program is allowed to access the contents, and can only wait. Only the media player 302 has the right to modify the contents in the interactive information storage unit 303.

The interactive information storage unit 303 can be located in any storage media. The size of the storage area depends on the number of items in the supported advertising information and the size of the storage capacity occupied by each of the items;

The interactive information can be classified into a first type of interactive information and a second type of interactive information according to the different manners via which the interactive information is written into the multimedia files. The interactive information written in the multimedia file head is the first type of interactive information, and the interactive information written in the multimedia file body is the second type of interactive information.

The parsing unit 3021 is used for parsing the video files, wherein the video files include interactive information carrying the communication sign, and for transmitting the parsed interactive information carrying the communication sign to the interactive information storage unit 303. The first type of interactive information obtained by parsing is transmitted to the first storage unit 3031; and the second type of interactive information obtained by parsing is transmitted to the second storage unit 3032.

Then, the first storage unit 3031 is used for storing the parsed first type of interactive information, and the first type of interactive information is parsed and stored when the parsing unit 3021 starts to parse the video files.

The second storage unit 3032 is used for storing the parsed second type of interactive information, and updating the stored second type of interactive information itself by the currently received parsed second type of interactive information.

The operating unit 3022 is used for playing the multimedia files. During playing the multimedia files, the operating unit 3022 is configured to read the interactive information that the user desires to display from the interactive information storage unit 303 upon receiving the trigger signal indicating that the user desires to display the interactive information, and displaying the interactive information via the first information window, and continuously displaying the first type of interactive information in the first information window; or displaying the second type of interactive information in the first information trigger window, and during the process of playing the multimedia files, updating the second type of interactive information displayed in the first information trigger window by using the current second type of interactive information.

The first type of interactive information and the second type of interactive information can exist alone depending actual needs. The detailed realization is substantially similar to what has been describe above, thus will not be further explained in detail.

The interactive unit 3023 is used for accessing the server 31 based on the trigger of the communication sign carried in the interactive information by the user.

For example, after the user accesses the payment bank website through the interactive unit 3023, the operating unit 3022 pops up the electronic payment interface of the online bank, in which the producer or vendor name, goods names, unit price of the goods, number for purchasing and bank account, etc. are included. The user just needs to fill in needed information, such as the number for purchasing.

In summary, the present invention discloses a technique of adding interactive information related to advertisements into multimedia files. The interactive information includes, for example, transaction information, a website address of the vendor, a discount website, a service telephone number, and etc. Via the interactive information, the user can directly contact with the vendor, producer or service provider via Internet or telephone conveniently. The service provider includes a web service provider or bank. What described above greatly facilitates an online operation by the user. The current advertising mode is usually unilateral and the advertising contents are just pure advertisements. After viewing the advertisements, the user needs a remembering or recording process for the contents of interest. As far as the user is concerned, viewing the advertisements and the payment operation are separated;

The media player according to the present invention, on the one hand, parses the newly added advertising information TLV, and on the other hand, is able to support an activation from the user. When the user has an intention to purchase or find out further information on a presented object, via a key, the media player is configured to pop up a selection interface, and the selection interface can either be a menu selection interface or a panel selection interface; after the user performs one or more selections through the selection interface, the selection interface will automatically display the interface that the browser logs on to the server. The user can perform related online payment or web access. For the user terminals like mobile phones, a call connection can be created. Therefore, by using the technical solution of the present invention, the user does not need to input website information or telephone number manually, which facilities the commerce operation by the user.

According to the present invention, the media advertisements and the electronic payment by a user are connected. After viewing discount information, the user can decide to buy quickly, from viewing related advertising contents to deciding to purchase and make a payment electronically. The whole process can be accomplished seamlessly. As for the user that does not have the intention to purchase or find out further information about an advertisement, the multimedia files will not pop up any contents during the playing process. Therefore, using the technical solution of the present invention will make the user buying operation much more convenient.

Obviously, those skilled in the art can make any modifications and variations to the present invention without departing from the spirit and scope of the present invention. In this way, if the modifications and varieties to the invention are within the scope of the claims of the present invention and the equivalents, the present invention is also intended to contain these modification and varieties.

What is claimed is:

1. A method for realizing interaction with embedded data through multimedia, the method comprising:
   encoding and writing in a first server the embedded data into a video file in a format including a data head and a data body, wherein content in the embedded data is continuously updated; and
   sending the video file from the first server to a user terminal caused to perform operations of
   parsing the video file to obtain the embedded data from the video file while the video file is being played back in a first window, wherein the updated content in the embedded data is displayed in a second window upon receiving a trigger signal indicating that a user has interacted with the embedded data; and
   accessing a second server in a browser automatically filled with necessary information obtained from the embedded data for the user to conduct an online transaction with the second server, wherein the second server is identified by a website address included in the embedded data.

2. The method of claim 1, wherein the updated contents in the embedded data are displayed in the second window separately from showing the video file being downloaded from the first server, wherein at least some of the embedded data is stored in a storage space of the user terminal.

3. The method of claim 1, wherein said parsing the video file further comprises:
   causing at least some of the embedded data to be stored in the user terminal, wherein the embedded data is obtained from the video file while the video file is being shown on the user terminal.

4. The method of claim 1, wherein the embedded data includes: at least one of a first type of the embedded data in the data body and a second type of the embedded data in the data head, wherein contents in the first type of the embedded data are continuously displayed in the second window, and contents in the second type of the embedded data are updated and displayed in the first window.

5. The method of claim 1, wherein the embedded data is interacted by the user via a button provided by the user terminal.

6. The method of claim 1, wherein the embedded data is interactive information including a communication sign that includes at least a website address linking to a telephone number.

7. The method of claim 6, wherein the embedded data further comprises at least one of vendor description, transaction information, discount information and shopping-ticket returning information.

8. The method of claim 7, wherein the embedded data includes at least one of beneficiary bank account information, a vendor name, a name of an advertised item and unit price information of the advertised item.

9. A system for realizing interaction with embedded data through multimedia, the system comprising:
a server providing an online transaction related to a promotion included in the embedded data in a multimedia file in a format including a data head and a data body, the server being identified by an address in the embedded data and connected from a user terminal, wherein the user terminal is caused to receive and play the multimedia file in a first window, the user terminal is configured to parse the multimedia file to obtain the embedded data while playing back the multimedia file, wherein the embedded data is displayed in a second window when receiving a trigger signal initiated by the user, the server is connected automatically in a browser filled with necessary information obtained from the parsed embedded data for the user to conduct an online transaction with the server, and
wherein the embedded data is static when the embedded data is presented in the data head of the multimedia file, and the embedded data is continuously updated when the embedded data is presented in the data body of the multimedia file.

10. The system of claim 9, wherein the user terminal is a mobile phone supporting online payment, user identity authentication, user signature and electronic payment, some content in the embedded data is stored in the user terminal and continuously updated, where the embedded data was originally from the data body of the multimedia file.

11. The system of claim 10, wherein the trigger signal is caused by activating a physical button or a logic button of the mobile phone by the user.

12. The method of claim 10, wherein the embedded data is interactive information including a communication sign including at least one of a website address and a telephone number related to a business of the website address.

13. The method of claim 9, wherein the embedded data includes: at least one of a first type of the embedded data and a second type of the embedded data, wherein the first type of the embedded data is continuously displayed in the second window, and the second type of the embedded data is updated and displayed in the first window.

14. A system for realizing interaction with embedded data through multimedia, the system comprising:
a mobile device configured to receive at least one multimedia file, and caused to parse the multimedia file to obtain the embedded data therefrom while the multimedia file is being played back on the mobile device, wherein the embedded data is displayed in a separate display when receiving a trigger signal initiated by the user, the mobile device is caused to be coupled to a server automatically using necessary information obtained from the embedded data for a user of the mobile device to conduct an online transaction with the server, wherein part of the embedded data is static when the part of the embedded data is presented in a data head of the multimedia file, and another part of the embedded data is continuously updated when the another part of the embedded data is presented in a data body of the multimedia file.

15. The system of claim 14, wherein the mobile device is caused to create a call connection with a phone number extracted from the embedded data.

16. The system of claim 14, wherein the mobile device is equipped with functions related to at least one of online payment, user identity authentication, user signature and electronic payment so that the user goes on to conduct an online transaction with the server.

17. The system of claim 14, wherein the mobile device executes a browser, the browser is automatically filled with necessary information from the embedded data to establish a connection between the mobile device and the server.

18. The system of claim 17, wherein the mobile device includes at least a button for the user to initiate the trigger signal to express a desire to explore further a promotion being promoted in an advertisement embedded in the embedded data.

19. The system of claim 17, wherein the embedded data includes at least a website address of the server, wherein the website address is used automatically by the mobile device to access the server upon request by the user.

* * * * *